F. M. BAIR.
APPLE SIZER.
APPLICATION FILED NOV. 24, 1913.
1,103,647.
Patented July 14, 1914.
3 SHEETS—SHEET 1.
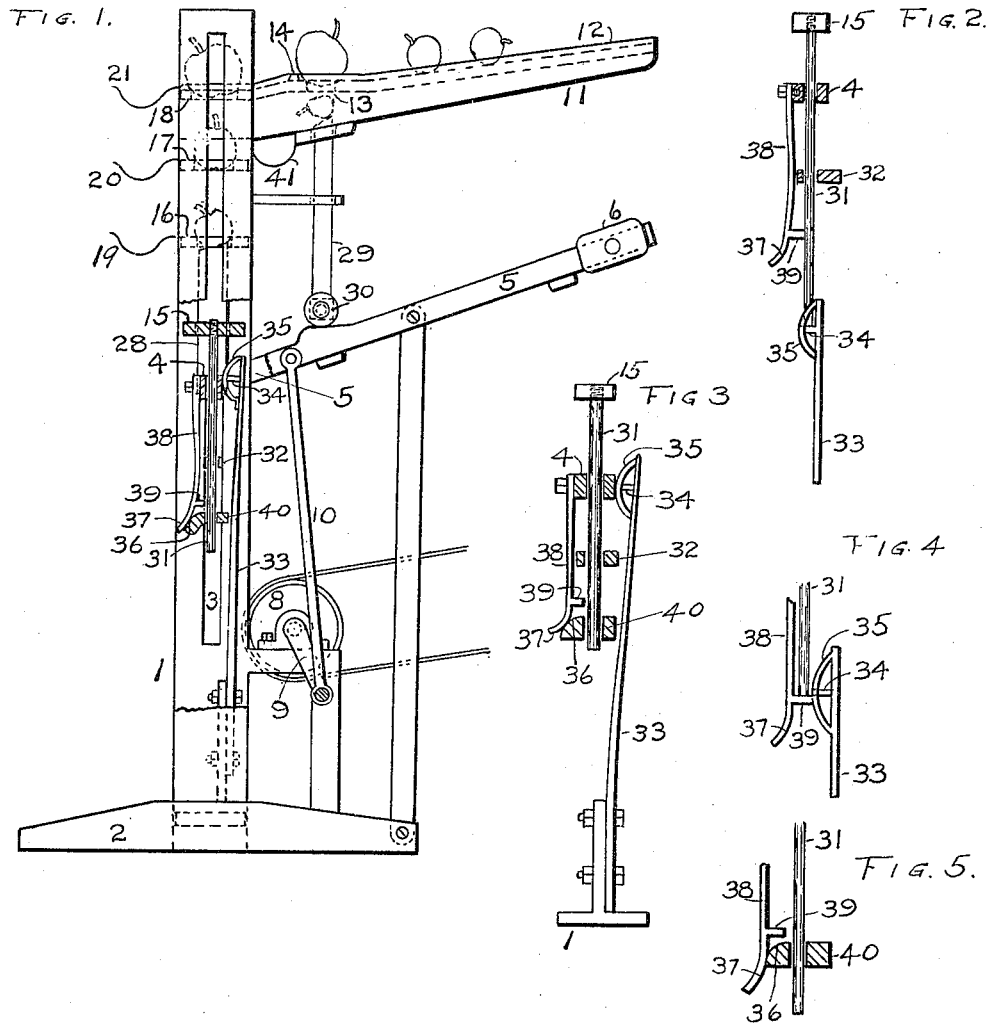
WITNESSES:
INVENTOR.
Floyd M. Bair
BY Clark C. Wood
ATTORNEY.

F. M. BAIR.
APPLE SIZER.
APPLICATION FILED NOV. 24, 1913.
1,103,647.
Patented July 14, 1914.
3 SHEETS—SHEET 2.
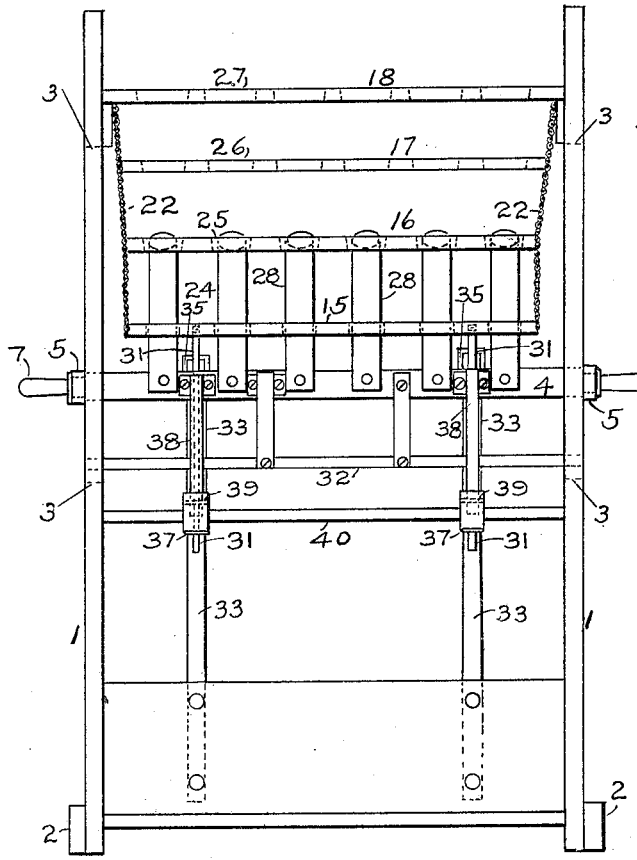
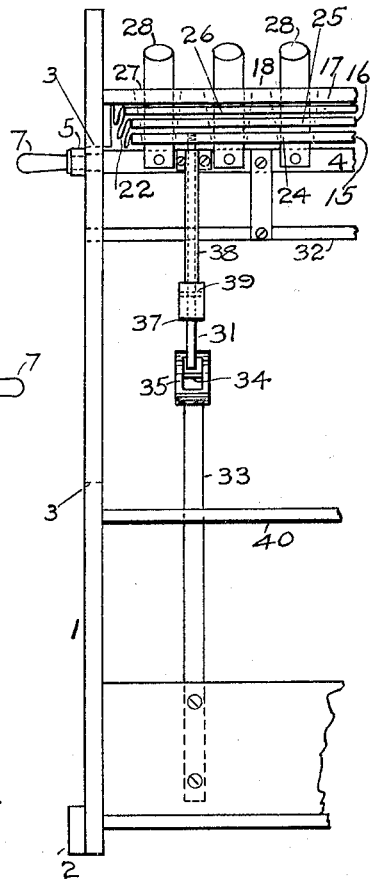
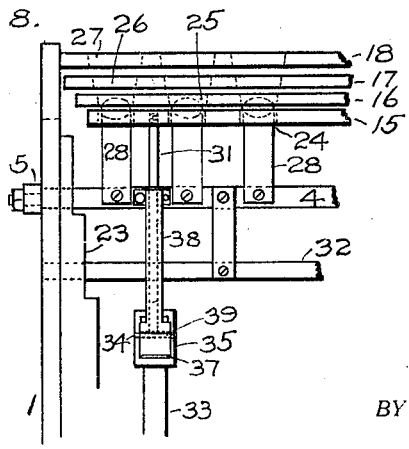
WITNESSES:
INVENTOR.
BY
ATTORNEY.

F. M. BAIR.
APPLE SIZER.
APPLICATION FILED NOV. 24, 1913.
1,103,647.
Patented July 14, 1914.
3 SHEETS—SHEET 3.
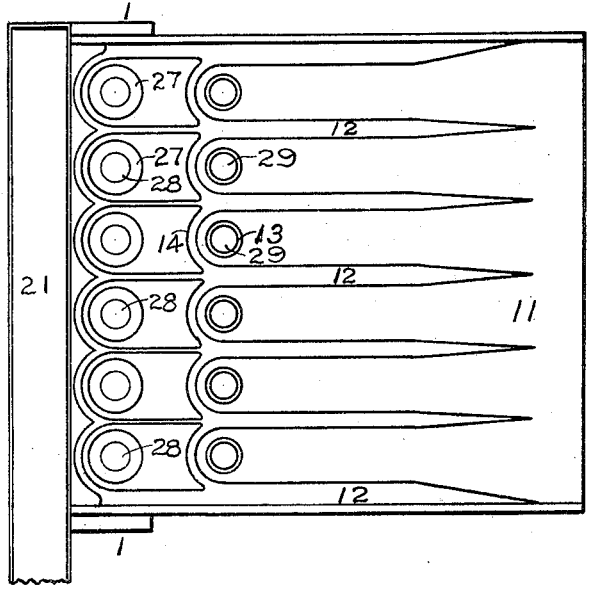
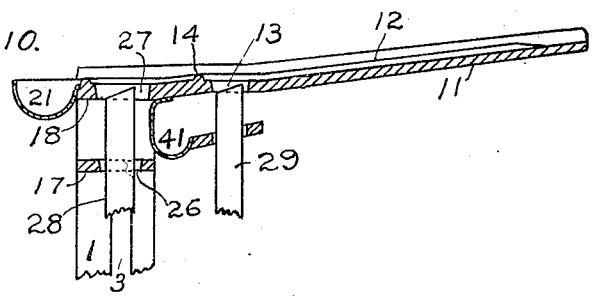
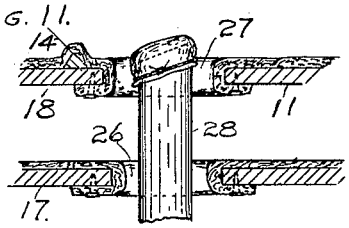
WITNESSES:
INVENTOR.
Floyd M. Bair
BY
ATTORNEY.

UNITED STATES PATENT OFFICE.

FLOYD M. BAIR, OF GRAND LEDGE, MICHIGAN.

APPLE-SIZER.

1,103,647.   Specification of Letters Patent.   Patented July 14, 1914.

Application filed November 24, 1913. Serial No. 802,793.

*To all whom it may concern:*

Be it known that I, FLOYD M. BAIR, a citizen of the United States, residing at Grand Ledge, in the county of Eaton and State of Michigan, have invented new and useful Improvements in Apple-Sizers, of which the following is a specification.

My invention relates to machines for sizing fruit, and while it may be applied to various kinds of fruit I have illustrated it as applying to the sizing of apples.

Its purpose is to make a device that shall reliably divide the fruit into the required number of sizes without bruising or otherwise injuring it, and that shall be simple and economical in construction and reliable in operation. I attain these purposes by the means shown in the accompanying drawings in which—

Figure 1 is an elevation from the right hand end of my device, a part of the frame being broken away to show the operation of the mechanism. Figs. 2, 3, 4 and 5 are details illustrating the operation and will be more fully explained hereafter; Fig. 6 is a front elevation partly in diagram; Fig. 7 is a detail illustrating the operation and will be more fully explained hereafter, and Figs. 8, 9, 10 and 11 are details illustrating different features of the construction.

Referring to the drawings, 1 is the main frame of the machine which may be of any desired form or construction appropriate for the purpose, which is supported on feet or standards 2. A slide 3, is formed in each of the opposite uprights of the frame 1, in which moves vertically across bar 4. Levers 5 are connected to the opposite extremities of the cross bar 4, and the weight of the cross bar and its appurtenances is preferably counterbalanced by weights 6. Vertical motion is given to the cross bar 4 by handles 7, as shown in Fig. 6, or by any other suitable means, as for example, the pulley 8, cranks 9, and connecting rods 10 shown in Fig. 1. To the upper part of the frame is attached a shallow tray or platform 11, for receiving the fruit to be sized. This platform is inclined at a suitable angle so that when the fruit is placed upon it, it will roll down by gravity to the lower end. Guides 12, (Fig. 9) are placed on the upper surface of the tray so that the apples as they roll down will form themselves into rows. At the lower end of the tray 11, is formed a series of openings 13, of such a size that the smallest or cull apples will fall through these openings into a conveyer 41 (Fig. 10). Just beyond the openings 13, are shallow cross bars 14 to prevent the apples from rolling beyond the openings 13 until forced over these bars by the pins 29.

A number of shelves 15, 16, 17 and 18 are mounted between the uprights 1, the top shelf 18 being securely attached to the uprights at the level of the lower end of the tray 11, in substantially the position shown in Fig. 1. The remaining shelves, of which 3 are shown in the drawings, but of which as many may be employed as may be desired according to the number of sizes into which the fruit is to be divided are free to rise between the uprights 1, until they are substantially together at the top of the machine as shown in Fig. 8, and to fall until at the level of the conveyers 19, 20 and 21, etc., by which the different sizes of apples are delivered to the appropriate storage bins. Their downward movement is limited by any proper means, for example, strips of canvas 22, to which the ends of the shelves are attached, as shown in Fig. 6, or ledges 23 as shown in Fig. 8, upon which the ends of the shelves can rest when dropped to their lowest points. Various other means for arresting the downward motion of the shelves may be employed without departing from my invention. The shelves 15, 16, 17 and 18 are pierced with concentric holes 24, 25, 26 and 27, the holes in each shelf being of such size as to permit all apples smaller than the size determined for that shelf to pass through. A series of pins 28 are mounted on the cross bar 4, each pin being concentric with the openings 24, 25, etc. These pins have their extremities inclined and provided with padding to prevent the bruising of the fruit as shown in Figs. 10 and 11. A second series of pins, 29, is mounted concentric with the openings 13 and inclined and padded in similar manner to the pins 28. These pins are also operated by the levers 5, through friction rollers 30. Rods 31 are attached near each extremity of the lowest shelf of the series of shelves above mentioned and extend downward through appropriate guides 32. A spring 33, has its lower extremity secured to the frame and is provided at its upper extremity with a stop 34, and inclined planes or cams 35. One of the guides 40, has its outer edge formed into an inclined plane 36, which also carries near its lower extremity a stop 39. The spring 38 has its upper extremity connected to, and rises and falls with the cross bar 4. The stops 34 and 39 are so placed as to engage under certain conditions with the lower extremities of the rods 31 as shown in Figs. 2 to 7 inclusive, as will be more fully explained hereafter.

The operation of the device is as follows: In Fig. 1 the shelves 15, 16, 17 and 18 and the cross bar 4 are shown substantially at their lowest points, the upward stroke of the cross bar 4, being just beginning. As the cross bar 4 rises, the point of the pin 28 passes through the shelf 16 pushing off any apples that may lie on this shelf which fall into conveyer 19 down which they roll to their appropriate bins. During the first part of the stroke the shelf 15 does not rise but the cross bar 4 slides upward along the rods 31 until the cross bar 4 engages the bottom of the shelf 15. The cross bars 4 and the shelf 15 then continue to rise together and the pins 28 successively pass through the openings in the shelves 17 and 18 pushing off the apples that may lie upon them, and piling up the shelves one upon the other until the position shown in Fig. 7 is reached. Just before this point is reached the lower ends of the rods 31 pass above the stops 34 which then spring forward into position to catch the rods on their descent. At the same time, the pins 29 will also have been rising and near the top of the stroke will push off the apples that are resting in the openings 13, pushing them over the lower ledges 14. These apples will then roll down and rest against the upper ends of the pins 28 which will then project through the upper shelf. At the same time other apples will roll down and rest against the upper ends of the pins 29. The cross bar 4 now commences to descend carrying with it the pins 28; but the shelf 15 with the other shelves 16, 17 and 18 lying upon it, is sustained in its elevated position by the stops 34. The relative position of the parts just after the descent has commenced is shown in Fig. 2, in which the cross bar 4 is sliding down the rods 31 toward the stop 34, which is holding the shelf 15, and therefore the other shelves in the elevated position. This condition continues until the pins have sunk below the level of the movable shelves into substantially the position shown in Fig. 8. As soon as the upper extremities of the pins 28, pass below the level of the upper shelf 18, the apples which rest against those pins as above described will roll forward and into the opening in the upper shelf. At practically the same time the apples roll into the openings 13, and if small enough, pass through these openings and fall into the conveyer 41, down which they roll to the cull bin. If not small enough, they are stopped by the edges of the openings 13 and the ledges 14, and remain there awaiting the next stroke. The apples, which, as already described, have fallen into the openings in the shelf 18, fall down through the various shelves with the descent of the pins 28 until they reach a shelf through which they cannot pass. Just before the position shown in Fig. 8 is reached, the stops 39 engage with the cams 35 on each side of the stops 34 and pushes the stops 34 backward until the position shown in Fig. 4 is reached, when the stops 34 completely cease to support the rods 31 and the stops 39 take their place. The stops 39 being connected to the spring 38 and the cross bar 4 descend with this cross bar and permit the shelves to descend reversing the action by which they were piled one up on the other. The apples resting upon these shelves of course descend with them until the shelves have reached the limit of their drop as determined by the length of the supporting canvas, or chains, or shoulders 23. At this point the cams 37 at the lower end of the springs 38 engage with the inclined portion 36 of the guide 40 and are forced outward so that they no longer support the rods 31 which then permit the shelf 15 to drop down to its lowest point. The parts then occupy the relative position shown in Figs. 1 and 5, and the device is then ready to begin a new upward stroke.

Several modifications of my mechanical construction may be employed without departing from my invention. For example, the pins 29, the openings 13 and the ledges 14 might be dispensed with, and the cull apples permitted to fall directly down through the openings in the shelves 16, 17 and 18 until they fall on the shelf 15, and roll off at one side into conveyers or bins as may be desired.

I claim:

1. The combination in a fruit sizer of a stationary shelf and a plurality of movable shelves, each of said shelves being provided with concentric openings increasing in size from the lowest to the highest shelf; a series of push pins having their axes concentric with the holes in said shelves, and means for alternately raising and lowering said push pins.

2. The combination in a fruit sizer of a stationary shelf and a plurality of movable shelves, each of said shelves being provided with concentric openings increasing in size from the lowest to the highest shelf; a series of push pins having their axes concentric with the holes in said shelves; and means for alternately raising and lowering said push pins, said means also being adapted to raise said movable shelves.

3. The combination in a fruit sizer of a stationary shelf and a plurality of movable shelves, each of said shelves being provided with concentric openings increasing in size from the lowest to the highest shelf; a series of push pins having their axes concentric with the holes in said shelves; and means for alternately raising and lowering said push pins, said means also being adapted to raise said movable shelves, and releasable stops for retaining said movable shelves in an elevated position.

4. The combination in a fruit sizer of a stationary shelf and a plurality of movable shelves, each of said shelves being provided with concentric openings increasing in size from the lowest to the highest shelf; a series of push pins having their axes concentric with the holes in said shelves; means of alternately raising and lowering said push pins, said means also being adapted to raise said movable shelves; releasable stops for retaining said movable shelves in an elevated position, and means for releasing said stops at any desired point during the descent of said pins.

5. The combination in a fruit sizer of a frame provided with slides at its opposite extremities; a stationary shelf near the top of said frame; a plurality of vertically movable shelves below said stationary shelf, said shelves being provided with concentric graduated openings adapted to receive fruit; a cross bar slidably mounted in said frame beneath said shelves; pins mounted in said cross bar and concentric with the openings in said shelves, and means for raising and lowering said cross bar.

6. The combination in a fruit sizer of a frame provided with slides at its opposite extremities; a stationary shelf near the top of said frame; a plurality of vertically movable shelves below said stationary shelf, said shelves being provided with concentric graduated openings adapted to receive fruit; a cross bar slidably mounted in said frame beneath said shelves; pins mounted in said cross bar and concentric with the openings in said shelves; means for raising and lowering said cross bar, and releasable stops attached to said frame and adapted to retain said movable shelves in an elevated position during the lowering of said cross bar.

7. The combination in a fruit sizer of a frame provided with slides at its opposite extremities; a stationary shelf near the top of said frame; a plurality of vertically movable shelves below said stationary shelf, said shelves being provided with concentric graduated openings adapted to receive fruit; a cross bar slidably mounted in said frame beneath said shelves; pins mounted in said cross bar and concentric with the openings in said shelves; means for raising and lowering said cross bar; releasable stops attached to said frame and adapted to retain said movable shelves in an elevated position during the lowering of said cross bar, and a second stop attached to said cross bar and adapted to maintain the lowest of said movable shelves at a fixed distance from said cross bar during the descent of said cross bar after the release of said first mentioned stops.

8. The combination in a fruit sizer of a frame provided with slides at its opposite extremities; a stationary shelf near the top of said frame; a plurality of vertically movable shelves below said stationary shelf, said shelves being provided with concentric graduated openings adapted to receive fruit; a cross bar slidably mounted in said frame beneath said shelves; pins mounted in said cross bar and concentric with the openings in said shelves; means for raising and lowering said cross bar; releasable stops attached to said frame and adapted to retain said movable shelves in an elevated position during the lowering of said cross bar; a second stop attached to said cross bar and adapted to maintain the lowest of said movable shelves at a fixed distance from said cross bar during the descent of said cross bar after the release of said first mentioned stops and means for releasing said second stop before said cross bar reaches its lowest point.

9. The combination in a fruit sizer of a frame provided with slides at its opposite extremities; a stationary shelf near the top of said frame; a plurality of vertically movable shelves below said stationary shelf, said shelves being provided with concentric graduated openings adapted to receive fruit; a cross bar slidably mounted in said frame beneath said shelves; pins mounted in said cross bar and concentric with the openings in said shelves; rods mounted in the lowest of said movable shelves and extending downward therefrom; releasable stops attached to said frame and adapted to engage with the lower extremity of said rods, and retain said movable shelves in an elevated position, said stops being also provided with releasing cams; a second stop attached to said cross bar and adapted to engage with the lower extremity of said rods when released from said first mentioned stop, and provided with means for engaging with said releasing cam and releasing said first mentioned stops, and means for releasing said last mentioned stop before said cross bar has reached its lowest point.

FLOYD M. BAIR.

Witnesses:
H. L. LAWRENCE,
MAY LA ROCK.

Copies of this patent may be obtained for five cents each, by addressing the "Commissioner of Patents, Washington, D. C."